No. 879,327. PATENTED FEB. 18, 1908.
F. SCANLAN.
AXLE.
APPLICATION FILED SEPT. 3, 1907.
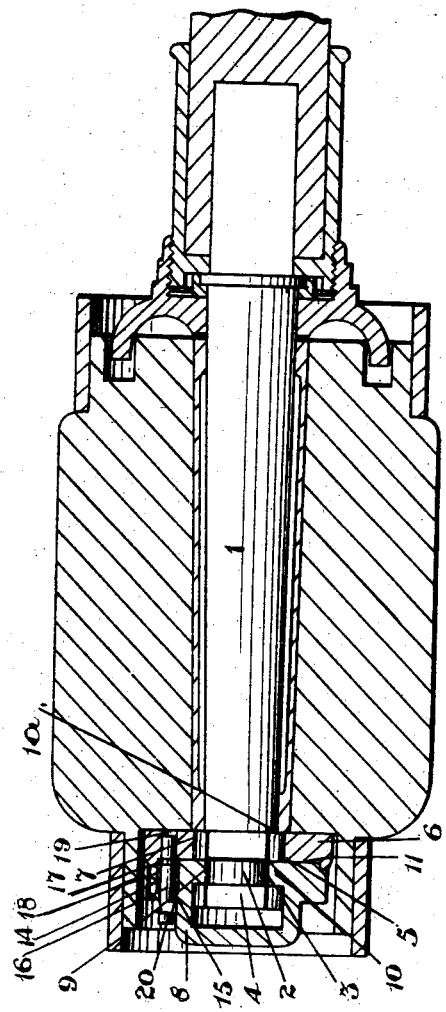
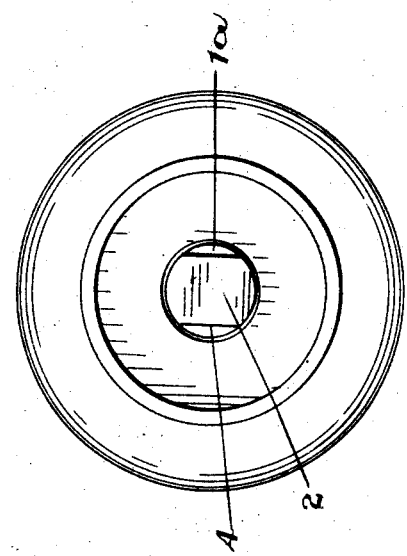
Witnesses. Inventor:

UNITED STATES PATENT OFFICE.

FRANK SCANLAN, OF BRANTFORD, ONTARIO, CANADA.

AXLE.

No. 879,327.  Specification of Letters Patent.  Patented Feb. 18, 1908.

Application filed September 3, 1907. Serial No. 391,218.

*To all whom it may concern:*

Be it known that I, FRANK SCANLAN, of the city of Brantford, in the county of Brant, in the Province of Ontario, Canada, have invented certain new and useful Improvements in Axles; and I hereby declare that the following is a full, clear, and exact description of the same.

This invention relates to certain new and useful improvements in axle-nuts, whereby the wheel hub is revolubly locked on the axle without screw threading the axle arm or axle nut. Ordinarily the extremity of the axle arm is screw threaded to receive a correspondingly threaded nut, but it has been proved in the actual use of this construction that the axle nut frequently becomes unscrewed from the axle arm and accidents result which otherwise would not have occured.
The object of the present invention is to provide the axle arm and the axle nut with a locking device which will securely hold the nut in place when fitted thereon, and this object is attained by the construction hereinafter set forth.

In carrying out the invention, the extremity of the axle arm is formed of an elliptical shape, with an annular recess therein. A non-revoluble washer, having a bore of corresponding shape and dimensions is fitted on the elliptically shaped part of the axle arm to abut against the shoulder formed at the junction of the elliptically shaped part and the hub seat of the axle arm. The axle nut has a central bore with that part adjacent to the inner side face of the nut, of the same shape as the elliptical part of the axle arm, and the inner part of the bore of an annular shape of slightly greater diameter than the major axis of the ellipse to form inwardly extending projections which engage in the annular recess.

The axle nut is provided with a spring pressed bolt and the washer is formed with a bolt aperture to receive the spring pressed bolt.

For an understanding of the invention reference is to be had to the following description and the accompanying drawings in which:—

Figure 1, shows the axle arm, nut, and washer in longitudinal section, and, Fig. 2, is an end view of the extremity of the axle arm showing the washer and axle nut removed.
Like characters of reference refer to like parts throughout the specification and drawing.

At the end of the hub seat 1ª, of the axle arm 1 is an axle projection 2, of smaller diameter than the hub seat, and in the axle projection is formed an annular recess 3. The sides of the axle projection are flattened as indicated at 4 to give it a substantially elliptical shape, and the annular recess at the flattened sides is flush with the surface of the projection. A washer 6, provided with a bore 7, correspondingly shaped is placed on the axle projection 2, the engagement of the flattened sides of the washer bore 7, with the flattened sides of the projection preventing the washer from turning on the axle projection. The axle nut 8, is provided with a bore 9, and in the bore adjacent to the washer 6, are flanges 10, registering with the recess 3. When the nut is being fitted on the axle arm the flanges 10, pass along the flattened sides of the axle projection 2, and when the nut is turned less than a semi-revolution they enter the annular recess 3, and engage behind the sides thereof, so that the nut will thereby be secured against displacement from the axle arm. The axle nut is prevented from turning on the axle projection by a locking bolt 16, which enters a bolt aperture 19 in the washer 6. As shown in the drawings the inner face of the nut 8, is formed with a flange 5, to enter a corresponding recess 11, in the washer 6, but this flange and recess may be dispensed with if desired.

The construction of the locking device is as follows:—A tubular recess 14, having a reduced end 15, is formed through the axle nut 8, and in this recess is contained a locking bolt 16, which has an enlarged part 17, a spring 18 being placed between the enlarged part 17, and the shoulder formed by the reduced end 15. The bolt aperture 19, is formed in the washer 6, to register with the recess 14, of the axle nut 8, when the latter has been turned to cause the projections 10 to engage in the recess 3 of the axle projection 2. The locking bolt 16, extends beyond the outer face of the nut 8, and may be provided with a knob or handle 20.

In assembling the parts, the wheel hub is placed on the hub seat of the axle arm, the washer 6, is then placed in position, and lastly the axle nut 8, is passed on the axle projection until its flanges 10 register with the annular recess 3. The axle nut is then turned until its flanges 10, enter the recess 3, and the locking bolt 16, which is pressed downward by the spring 18, enters the bolt aperture 19. To detach the wheel from the axle it is only necessary to withdraw the locking bolt from the bolt aperture 19, and turn the axle nut until its flanges 10 come into alinement with the flat part of the axle projection when all the parts may be removed.

Having thus fully described my invention what I claim as new and desire to secure by Letters Patent is:—

1. The hereinbefore described construction comprising an axle arm having a hub seat, and an axle projection having flattened sides, and a recess between its ends flush with the axle projection at the flattened sides thereof, a washer having a bore of corresponding shape to, and fitting on, that part of the axle projection adjacent to the outer end of the hub seat, an axle nut having a central aperture with side flanges extending inwardly within the aperture to pass over the flattened sides of the axle projection and engage in the recess, and releasable means carried by the axle nut and engaging with the washer to prevent rotation of the axle nut on the axle projection.

2. The hereinbefore described construction comprising an axle arm having a hub seat, an axle projection, with flattened sides, and a recess between its ends flush with the axle projection at the flattened sides thereof, a washer having a central aperture of corresponding shape to, and fitting the axle projection and an annular peripheral flange extending from its outer face, an axle nut having a disk shaped projection on its inner face and having a central aperture, with side flanges extending inwardly within the aperture to pass over the flattened sides of the axle projection and engage in the recess, the disk shaped projection of the axle nut engaging the outer face of the washer within the annular flange, and releasable means for preventing rotation of the axle nut on the axle projection.

3. The hereinbefore described construction comprising an axle arm having a hub seat, an axle projection, with flattened sides, and a recess between its ends flush with the axle projection at the flattened sides thereof, a washer, having a central aperture of corresponding shape to the axle projection and having a bolt hole in its outer surface, fitting on that part of the axle projection adjacent to the outer end of the hub seat, an axle nut having a central aperture of slightly greater diameter than the greatest width of the axle projection with side flanges extending inwardly within the aperture to pass over the flattened sides of the axle projection and engage in the recess, the axle nut having a bolt hole with a reduced outer end formed therethrough at such a position as to register with the bolt hole of the washer when the axle nut is in its turned position in the recess, and a manually operable spring bolt contained in the bolt hole of the axle nut and engaging the bolt hole of the washer for preventing rotation of the axle nut on the axle projection.

4. The hereinbefore described construction comprising an axle arm having a hub seat and an axle projection, at its outer end beyond the hub seat, the axle projection being of elliptical shape in cross section and having a substantially annular recess between its ends flush with the axle projection at the minor axis of the same, a washer having a central aperture of corresponding shape to and fitted on the axle projection adjacent to the hub seat, an axle nut having a central aperture of a diameter slightly greater than the length of the major axis of the axle projection, with flanges extending inwardly within the aperture to pass over the outer end of the axle projection and engage in the recess the inner face of the axle nut engaging the outer face of the washer, and means carried by the axle nut and engaging with the washer to prevent rotation of the axle nut relatively to the axle projection.

Brantford, August 5th, A. D. 1907.

FRANK SCANLAN.

Signed in the presence of—
W. S. BREWSTER,
CHARLES KAY.